Patented Aug. 13, 1935

2,011,256

UNITED STATES PATENT OFFICE 2,011,256

METHOD OF PRODUCING DI-METHYL-PYRAZOLONYL-DIPHENYL

Iwan I. Ostromislensky, New York, N. Y., assignor to Medico Chemical Corporation of America, New York, N. Y.

No Drawing. Application July 16, 1934, Serial No. 735,425

2 Claims. (Cl. 260—45)

My invention relates to methods of producing di-methylpyrazolonyl-diphenyl and its derivatives.

As I disclosed in my patent applications, Serial Nos. 717,723 filed Mar. 28, 1934, and 733,870, filed July 5, 1934, anti-shock preparations of the pyrazolonyl group have certain specific effectiveness in treating some of the allergic diseases, also in alleviating withdrawal symptoms in morphine addicts.

With this object in view, while investigating various anti-shock preparations, I discovered a new composition, di-methylpyrazolonyl-diphenyl, which proved to be one of the most effective and least toxic preparations for therapeutic purposes.

This preparation has never been described in the literature, and I prepared it for the first time by heating a mixture of 1 mol. of para, para-diphenyldihydrazine of the formula:

with 2 mol. of ethylacetoacetate.

Diphenyldihydrazine, required for this reaction, could be obtained by Arheidt's method, by reducing diazotized benzidine with sodium sulfite or tin chloride ($SnCl_2$). The yield of the preparation produced by this method is, however, quite insignificant. I developed, therefore, a new and more efficient method of producing diphenyl-dihydrazine from diazotized benzidine by sodium hydrosulfite ($Na_2S_2O_4$) as a reduction agent. Condensation of diphenyldihydrazine with ethylacetoacetate passes smoothly when the mixture is heated on a boiling water bath for a few hours.

Example I (a). Preparation of diphenyl-dihydrazine

A thoroughly homogenized mixture of 74.4 grams of benzidine (free base) with 200 grams of ice and 220 grams of hydrochloric acid of spec. gr. 1.19, is diazotized, using potassium iodide starch paper for control, by the solution of 60 grams of sodium nitrite in 120 cc. of water. The process of diazotization must be conducted in a vessel of a comparatively large capacity as the mixture has a tendency to form a foam.

To the resulting solution of diazo-compound is added at first 80 cc. of concentrated hydrochloric acid, and immediately afterward a previously cooled solution of 200 grams of sodium hydrosulfite in 1000 cc. of water containing about 20 drops of 40% sodium hydroxide. Concentrated hydrochloric acid is added to the resulting mixture, this time 400 cc. The mixture is well stirred and heated on a direct fire at boiling temperature for one half hour. The reddish-brown color of the mixture then turns into pale-yellow color of a sandy hue. The settling amorphous precipitate is filtered on the Buechner funnel and washed with water for removing mineral admixtures.

The product represents di-hydrochloride of diphenyldihydrazine, containing, however, other substances as admixtures. When heated in a capillary, the substance melts and decomposes at about 260° C. In order to obtain a free base, the substance is dissolved in a large amount of boiling water, and to the resultant solution, after filtering, saturated solution of sodium acetate is added in a quantity largely exceeding the theory. From this solution precipitates free diphenyl-dihydrazine, described for the first time by Arheidt. It is sucked off on a funnel and washed, first with water, then with alcohol, and, finally, with ether. The product is dried in desiccator in vacuo over sulfuric acid and paraffine. During the drying its color noticeably changes to a darker shade. The yield is about 55–65 grams. When heated in a capillary, the substance melts and decomposes at about 168–170° C. According to Arheidt it melts and decomposes at about 165–167° C.

(b). Preparation of di-methylpyrazolonyl-diphenyl

A thoroughly homogenized mixture of 35 grams of diphenyldihydrazine with 42.5 grams of ethylacetoacetate is heated with reflux condenser on a boiling water bath for 6½ hours. During that time the reaction mixture becomes solidified into a very dense amorphous mass of a very dark reddish-brown color. It is heated with 1 liter of 4% sodium hydroxide on a boiling water bath. The resulting solution is filtered, and the filtrate is mixed with 1 liter of water and 100 cc. of glacial acetic acid. For a more rapid precipitation of the product, powdered sodium chloride is added to the mixture. The mixture is left standing for 12 hours, then the settled precipitate is filtered, thoroughly washed with water, and dried in a desiccator over sulfuric acid. The product represents amorphous powder of a light brown color resembling the color of cocoa. The yield is about 35 grams, or about 100% by weight of the diphenyldihydrazine used. When heated in a capillary, the substance decomposes at about 135-143° C., rising and developing gas.

Being of the amphoteric type, the substance dissolves in alkalis as well as in relatively strong acids. When diluted with a large amount of water, acid solutions of this di-pyrazolonyl precipitate amorphous flocculi of the free base, of a very pale cream color. The precipitation of the substance is expedited by the addition of powdered sodium chloride to the mixture, although the largest part of the substance still remains in solution. It finally precipitates after adding sodium acetate to the solution.

The product, di-methylpyrazolonyl-diphenyl, is represented by the formula:

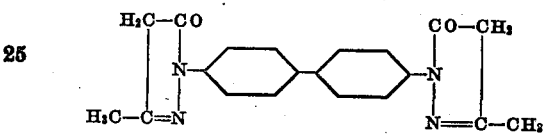

Di-methylpyrazolonyl-diphenyl easily couples under normal conditions with diazotized aromatic amines, forming every time a corresponding bis-azo-compound. In particular, upon treatment with diazotized aniline, a corresponding bis-phenyl-azo-compound is formed, as per formula:

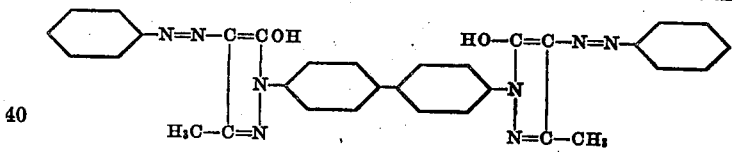

This azo-dye (di-phenylazo-di-methylpyrazolonyl-diphenyl) in a free state represents a dark-red, almost black, usually amorphous substance, which very easily dissolves in solid acetone. It is practically insoluble in water, 10% sodium hydroxide, and 10% hydrochloric acid.

When treating the hydrochloric acid suspension of di-methylpyrazolonyl-diphenyl with nitrous acid ($HNO_2$), a corresponding di-nitroso-compound is formed, as per formula:

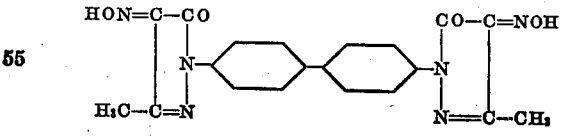

This substance (dinitroso-di-methylpyrazolonyl-diphenyl), when heated in a capillary, slowly decomposes, but does not melt even when heated to 275° C. When weak sodium hydroxide is added to this di-nitroso-compound, then a reddish solution is formed at first, from which, however, very promptly precipitate amorphous dark-red flocculi.

The di-nitroso-compound is practically insoluble in water, ether, and benzene, but is easily soluble in glacial acetic acid, cold acetone, absolute alcohol, and chloroform. The solution of this substance in acetone, glacial acetic acid, and alcohol, is precipitated by water in the form of amorphous, pale light-brown, or orange, flocculi.

The dark colored solutions of di-nitroso compounds in acetic acid are easily reduced by zinc dust, changing their color to light pale yellow, or becoming almost colorless. Nothing is precipitated upon dilution with water, but when left standing for a long time, the solutions regain the red color and begin to precipitate small amorphous flocculi of a dark red-brown color.

The reduction by zinc dust leads to the formation of a corresponding di-amido-dipyrazolonyl. The analysis of its hydrochloride fully corresponds to the following formula:

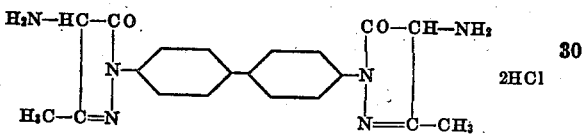

These diamido-compounds (diamido-di-methyl-pyrazolonyl-diphenyl) become evidently oxidized when left standing, turning in all probability into corresponding analogs of rubazonic acid.

I claim as my invention:

1. Method of producing di-methylpyrazolonyl-diphenyl, consisting in heating a mixture of diphenyldihydrazine with ethylacetoacetate.

2. A method of producing di-methylpyrazolonyl-diphenyl, consisting in heating a mixture of diphenyldihydrazine with ethylacetoacetate, adding sodium hydroxide to the resultant mass and heating the mixture, and precipitating the product by an acid.

IWAN I. OSTROMISLENSKY.